United States Patent [19]

Van Noten

[11] Patent Number: 5,661,841

[45] Date of Patent: Aug. 26, 1997

[54] OPTICAL FIBRE ORGANIZER HAVING FIBRE STORING MEANS

[75] Inventor: Lodewijk Cordula Michael Van Noten, Leuven, Belgium

[73] Assignee: Raychem Limited, United Kingdom

[21] Appl. No.: 612,915

[22] PCT Filed: Sep. 2, 1994

[86] PCT No.: PCT/GB94/01912

§ 371 Date: Mar. 6, 1996

§ 102(e) Date: Mar. 6, 1996

[87] PCT Pub. No.: WO95/07485

PCT Pub. Date: Mar. 16, 1995

[30] Foreign Application Priority Data

Sep. 8, 1993 [GB] United Kingdom .................. 9318585

[51] Int. Cl.⁶ ............................................ G02B 6/00
[52] U.S. Cl. ............................................ 385/135; 385/137
[58] Field of Search ............................. 385/135–139, 385/134, 147

[56] References Cited

U.S. PATENT DOCUMENTS 5,323,480  6/1994  Mullaney et al. .................. 385/134 X

FOREIGN PATENT DOCUMENTS

| 0178179 | 4/1986 | European Pat. Off. . |
| 2515363 | 4/1983 | France . |
| 2581769 | 11/1986 | France . |
| 8905509 | 7/1989 | Germany . |

Primary Examiner—Phan T. H. Palmer
Attorney, Agent, or Firm—Herbert G. Burkard; William D. Zahrt, II; Bruce M. Bertram

[57] ABSTRACT

An optical fiber organizer for receiving an optical fiber from one direction and storing loops thereof in a plane substantially perpendicular to that direction, which comprises: a substantially cylindrical block having a port running from an end of the cylinder where it is substantially parallel to the axis of the cylinder to a side of the cylinder such that a fiber within it is directed around the circumference of the cylinder.

11 Claims, 7 Drawing Sheets

OPTICAL FIBRE ORGANIZER HAVING FIBRE STORING MEANS

BACKGROUND OF THE INVENTION

The present invention relates to an organizer for controlling the bend radius of optical fibres or of an optical fibre cable.

It is frequently necessary in optical fibre networks to alter the direction of an optical fibre or cable, and due to the delicate nature of optical fibres this must be done in a carefully controlled way. Such a change of direction may be required where a cable passes through a wall or other bulkhead and must be properly aligned before being directed to a routing, splicing or splitting organizer. At this point of change of direction it may be desirable to store a short length of cable or fibre to aid subsequent splitting, splicing or routing.

SUMMARY OF THE INVENTION

We have found that an improved organizer can be produced in block form, which may be hollow, having a surface that undergoes the requisite change of direction.

Thus, the present invention provides an optical fibre organizer for receiving an optical fibre from one direction and storing loops thereof in a plane substantially perpendicular to that direction which comprises;

a substantially cylindrical block having a port running from an end of the cylinder where it is substantially parallel to the axis of the cylinder to a side of the cylinder such that a fibre within it is directed around the circumference of the cylinder.

The port itself need only bring the fibre to the circumference in an appropriate direction, and further means may be provided to ensure that the fibre maintains a generally circumferential path.

The organizer may organize one or more fibres, one or more tubes each carrying one or more fibres, or one or more optical fibre cables.

The organizer may be mounted on a wall etc. for which purpose it may be provided with one or more screw holes or other fixing means. The organizer will generally be provided within a housing, which may also incorporate other organizers whose function is to route individually or in groups various fibres broken out of an optical fibre cable or to accommodate fibre splices or fibre splitters.

The organizer is preferably of unitary construction, and may be moulded from any suitable plastics material.

BRIEF DESCRIPTION OF THE DRAWINGS

The invention is further illustrated with respect to the accompanying drawings, in which.

DESCRIPTION OF THE PREFERRED EMBODIMENTS

Figure 1:
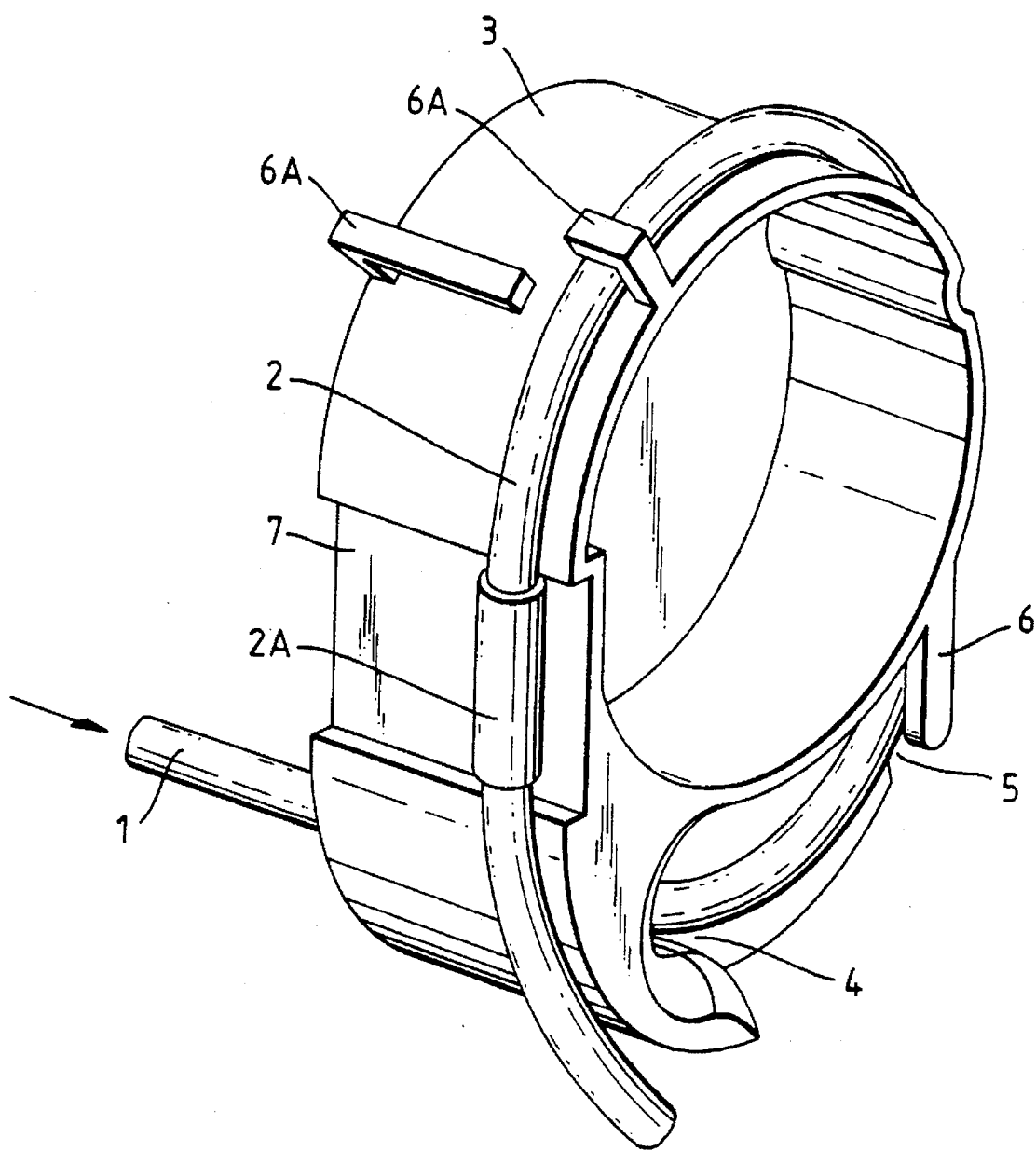
FIG. 1 is a perspective view of an organizer from above.

The organizer shown in FIG. 1 receives an optical fibre cable 1 from one direction and stores loops 2 thereof in a plane substantially perpendicular to that direction. The organizer comprises a block having a substantially cylindrical surface 3 and having a port 4 running from an end of the cylinder (hidden from view) where it is substantially parallel to the axis of the cylinder to a side of the cylinder 5 where the port may be regarding as meeting or breaking into the side of the cylinder. As a result the cable is directed around the circumference of the cylinder, and this can be seen to occur from the point marked 5 vertically upwards. The port 4 can be seen to curve in two planes between the points marked 4 and 5 in FIG. 1. In order for the port to merge gently with the circumferential wall, it preferably breaks that wall at an angle to the radius vector of the wall at that portion, i.e. not radially and preferably substantially tangentially.

The port between these two points can also be seen to be open in cross-section. This can be of advantage since it allows the cable 1 to be pushed through the port (or more precisely that part of it that is closed in cross-section) without the cable bending. When the cable has been pushed through a sufficient distance it can then be bent around the curved surface of the open part of the port and secured at position 5 by sliding it underneath retaining means 6. Retaining means 6 can therefore be seen to direct the cable towards a plane perpendicular to the axis of the cylinder.

Other retaining means 6a may be provided around the circumferential surface 3 to maintain the cable against that surface. The circumferential surface may contain one or more recesses 7 for example to accommodate a fibre splice or fibre tube joint 2A.

Figure 2:
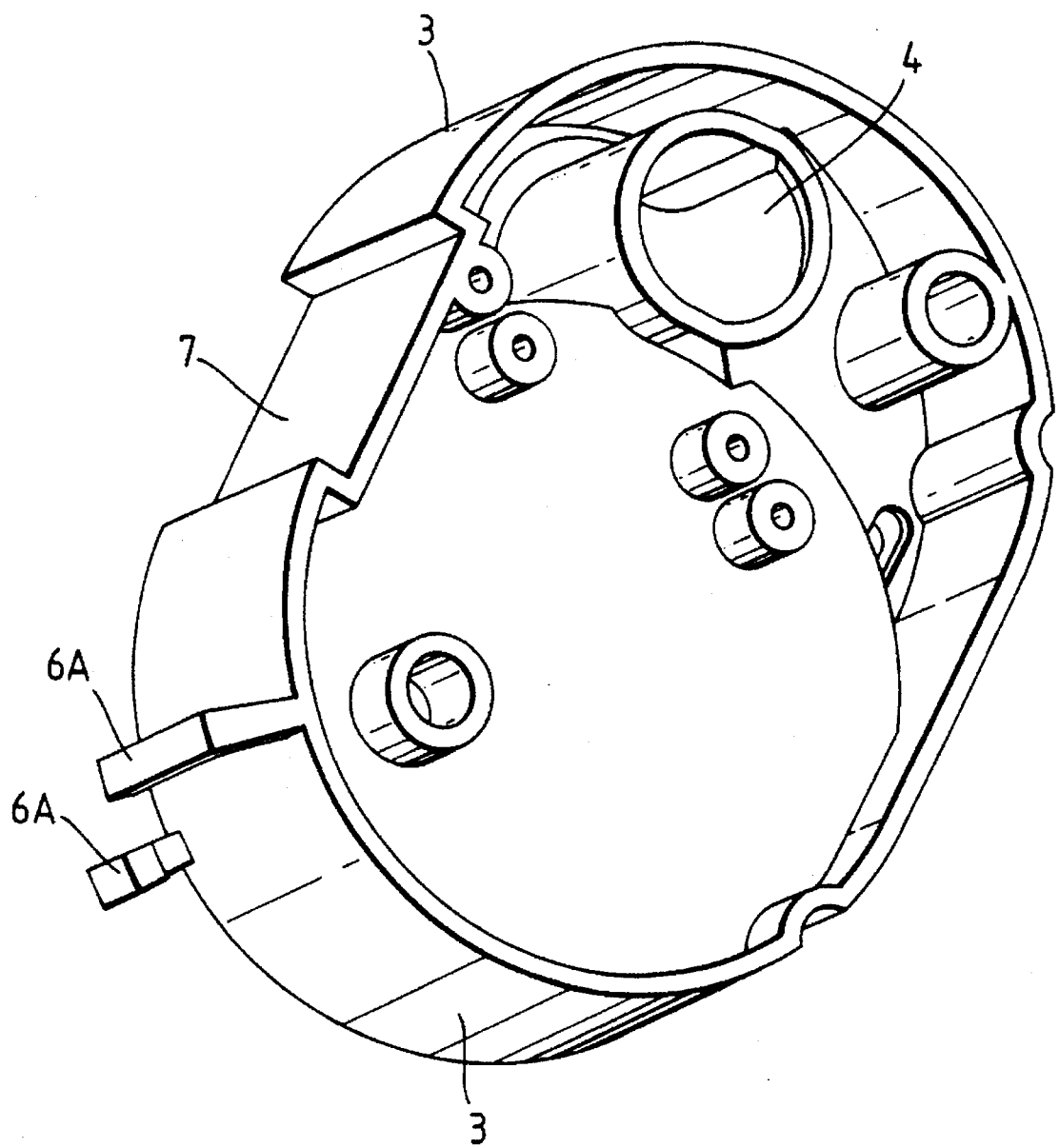
FIG. 2 is a perspective view from below.

FIG. 2 is a perspective view from below showing more clearly the portion of port 4 that is substantially parallel to the axis of the cylinder.

Figure 3:
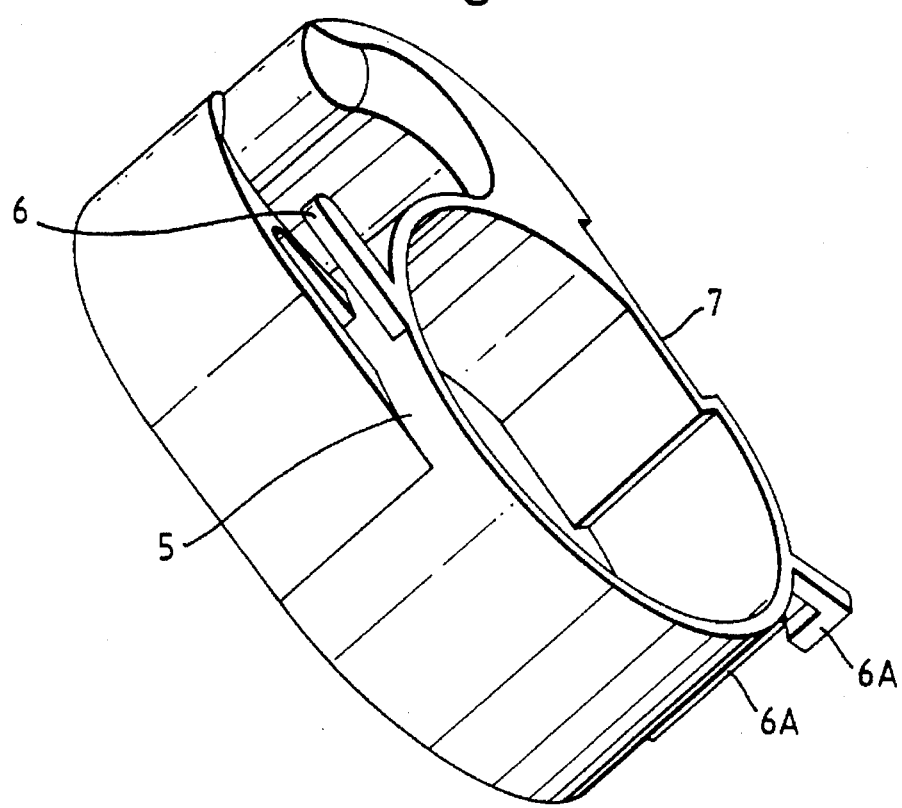
FIGS. 3 and 4 show two see-through perspective views.
Figure 4:
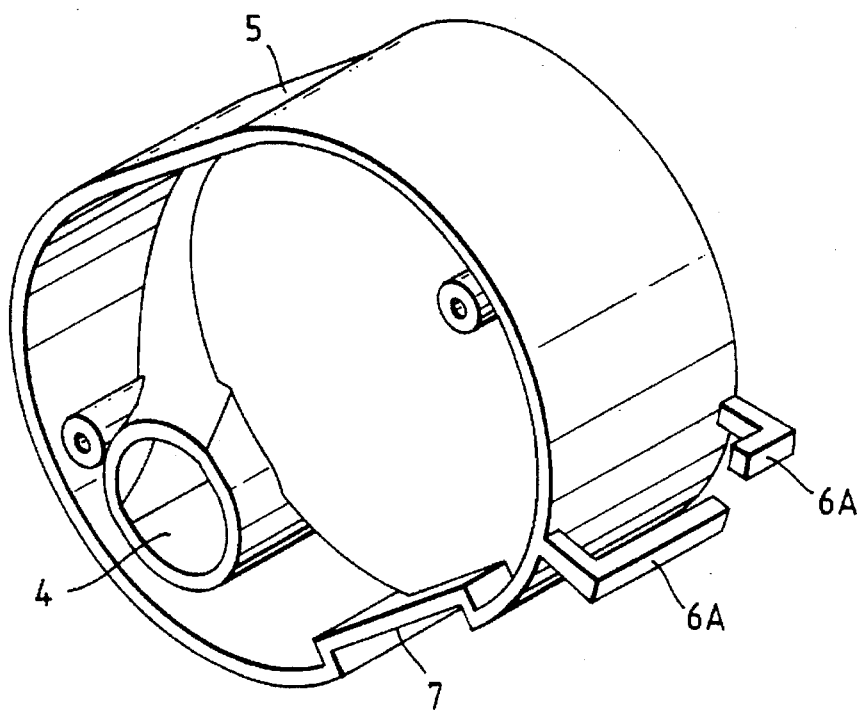
Figure 5A:
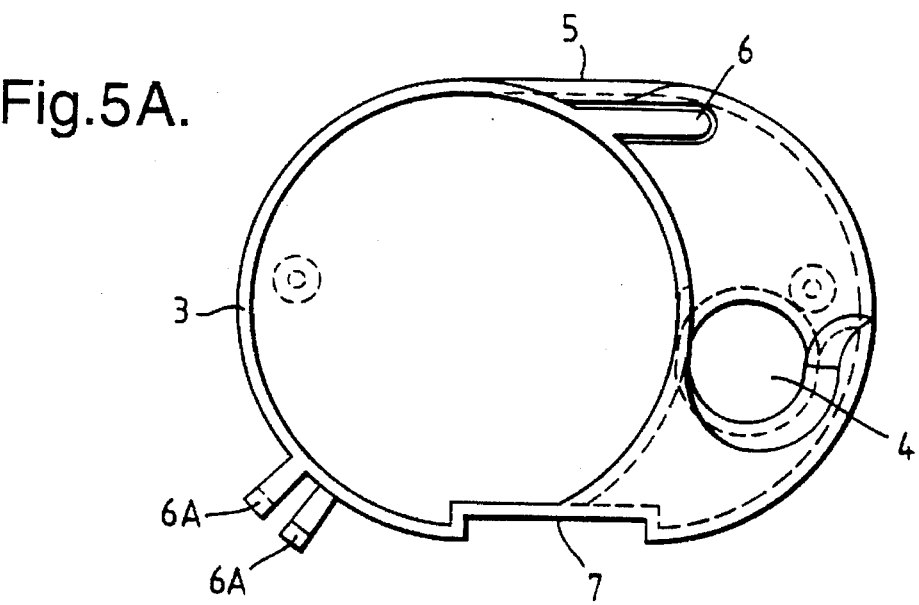
FIGS. 5 A–C show plan views from above and below and a side elevation.
Figure 5B:
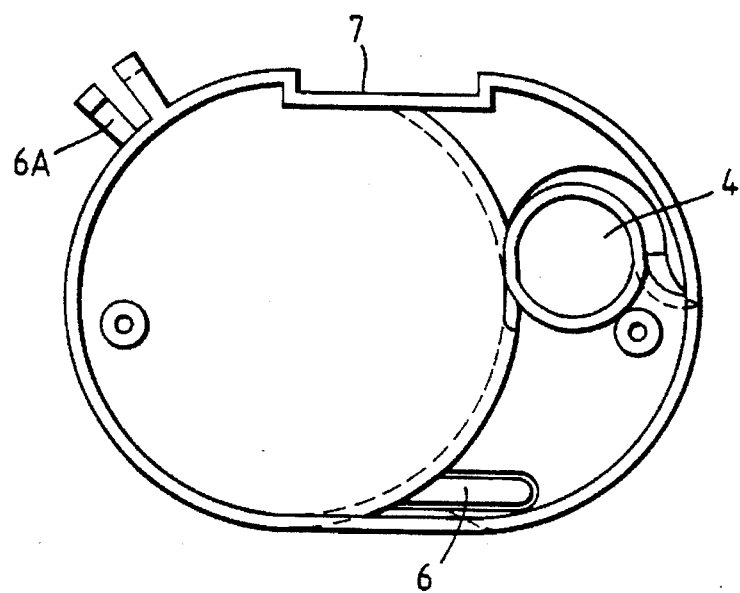
Figure 5C:
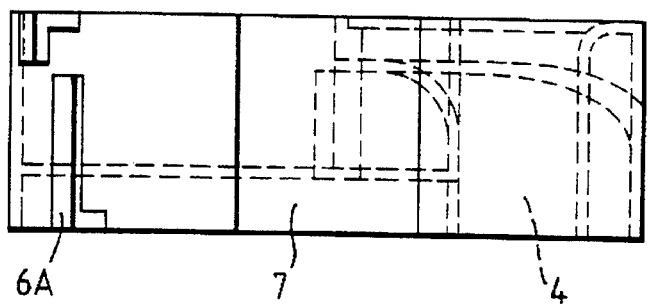

FIGS. 3 to 5 show various additional views of the organizer.

The wall of the port that directs the fibre should be curved at a minimum bend radius at least equal to the critical bend radius of the fibre. This can eliminate the need for further means to guide the fibres on a chosen, less curved, part of the surface. A wall of the port 4 that directs the cable in the desired direction can be seen from these figures to be curved, and that curve can be seen to result from a progressive broadening of the cross-sectional size of the port away from the underside of the cylinder.

The block may be of various shapes, and it need not be exactly cylindrical. For example it may be waisted or otherwise have a slightly non-constant shape or size along its length in order that fibres be retained at a chosen position along its length. The block illustrated has a cross-sectional shape that is substantially the envelope of two partially overlapping circles, as can be best seen perhaps from FIGS. 5a and 5b. In this case the port runs from a position within one only of the overlapping circles (and preferably substantially abutting the other circle) and then advances longitudinally along the cylinder whilst rotating around that other circle. Again this can be best seen perhaps from FIGS. 5a and 5b. Then, if one of the circles has a radius at least equal to the critical bend radius of the fibre to be stored, the path taken by fibres along port 4 will inevitably be sufficiently large.

Figure 6:
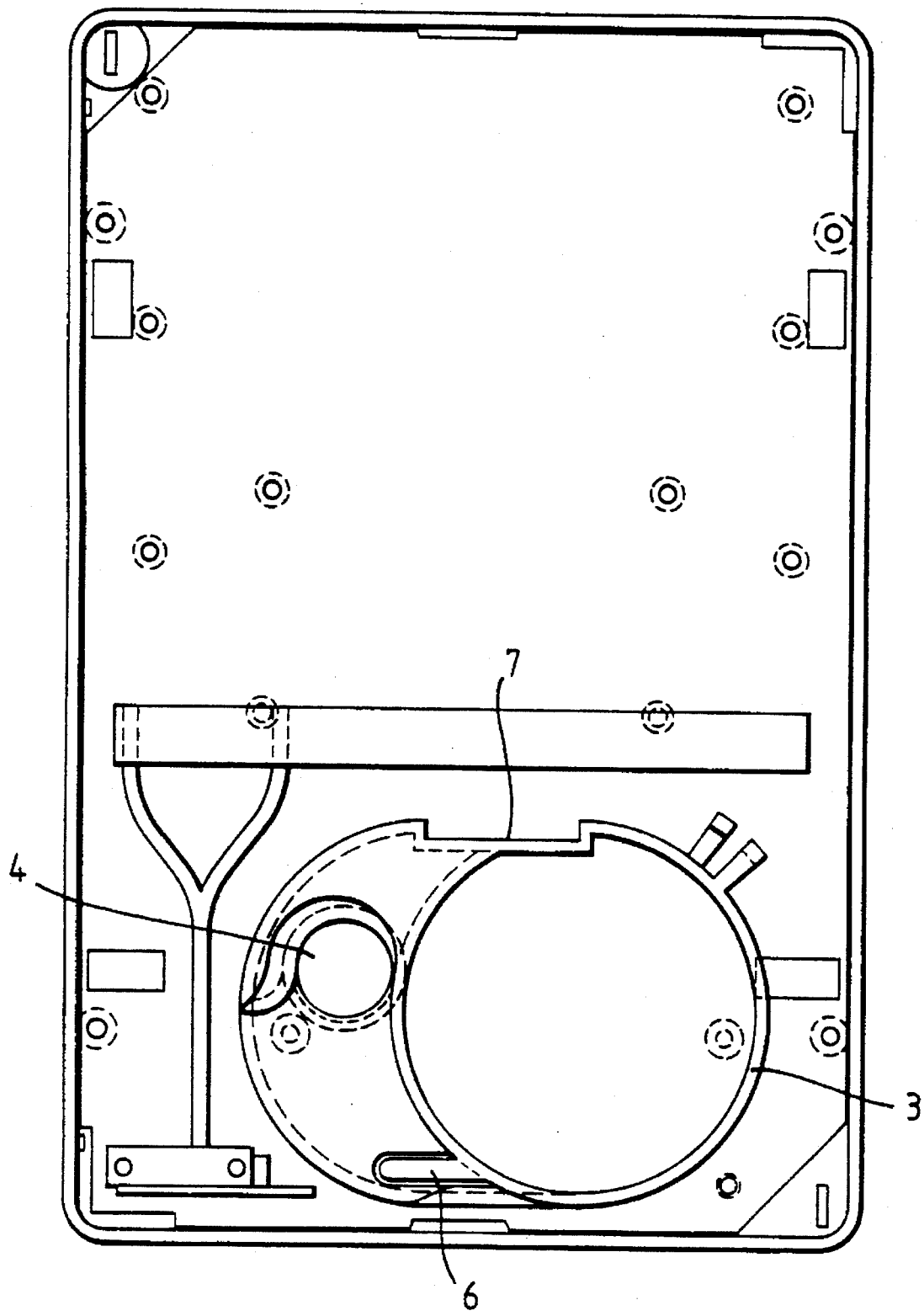
FIG. 6 shows an enclosure housing the organizer.

FIG. 6 shows an enclosure which may house the organizer of the invention. The rectangular space above the organizer may house a routing organizer such as that shown in FIG. 7. Fibres may therefore enter the enclosure through a wall or other bulkhead on which the enclosure is mounted via port 4. The fibres would then be stored around the organizer which they would leave vertically upwards as drawn to enter inlet ports of a routing organizer such as one having any one or more of the features illustrated in FIG. 7.

Figure 7:
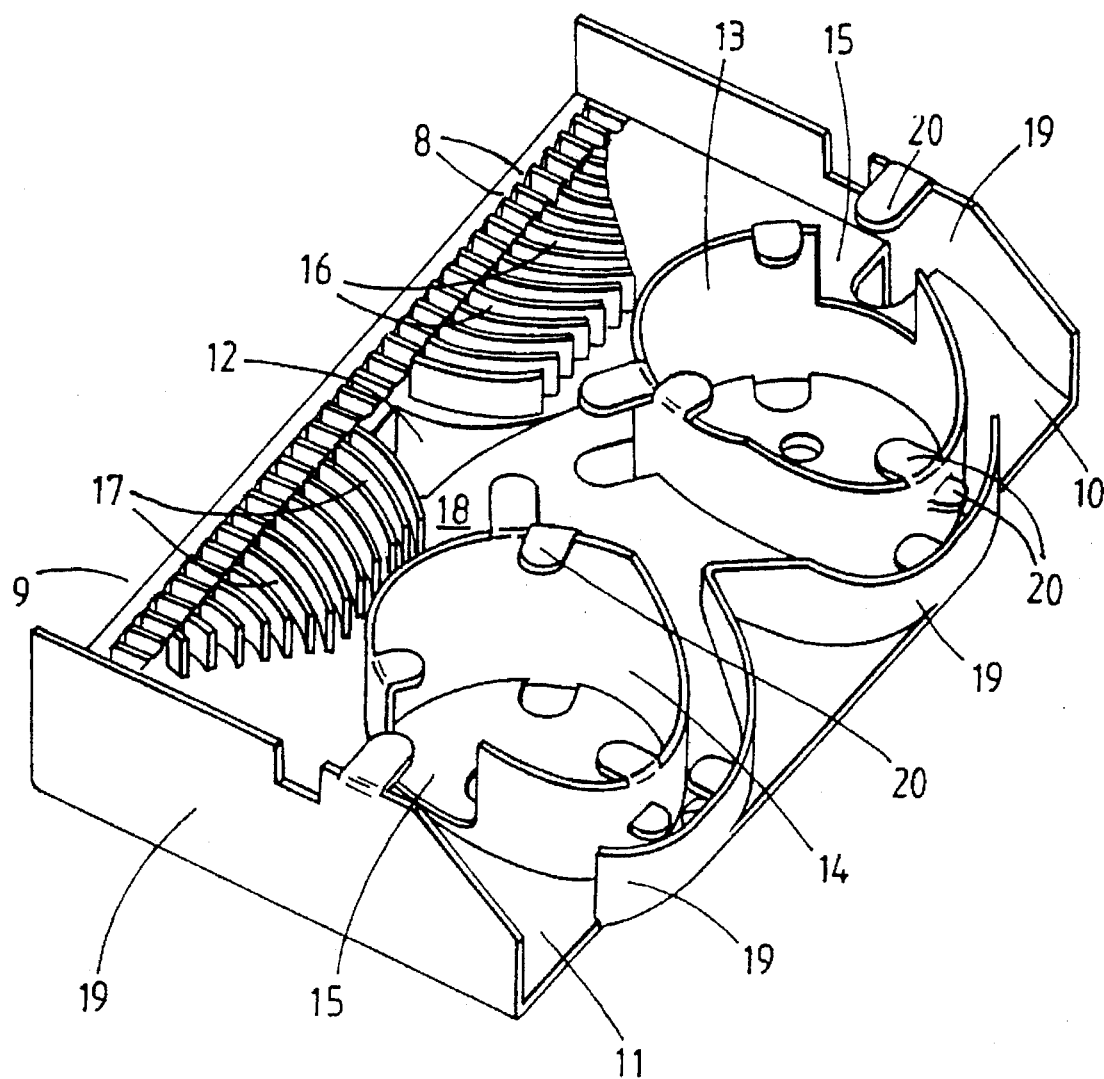
FIG. 7 shows a route organizer for use with the organizer of the invention.

The routing organizer shown in FIG. 7 has a first face partially bound by first (top left as drawn) and second (lower right as drawn) opposite edge portions, a first face:

1. bearing a plurality of inlet ports 8, 9 arranged along the first edge portion;
2. bearing an outlet port 10, 11 at each side of the second edge portion;
3. bearing two organizer drums 13, 14 or other organizing means positioned between the first and second edge portions; and optionally 4. having a through port that extends through it to an opposite face of the organizer;

the inlet ports 8, 9 preferably comprising a row of slots or other holes for receipt of fibre tube terminating devices and a series of curved walls 16, 17 (which may be continuous along their length or may comprise a series of posts) for constraining fibres leaving said tubes to a minimum bend radius equal to at least the critical bend radius of the fibre.

The drums 14, 15 are preferably such that a fibre passing between any of the walls 16, 17 and the outlet ports 10, 11 is constrained by an outer surface of one or both drums 13, 14 to the required bend radius. The drums 13, 14 are preferably hollow allowing a free end of fibre to pass from one of the ports, generally one of the inlet ports 8, 9, to the interior of the drums. The fibres will be stored in the drums at a minimum bend radius greater than that at which they suffer permanent damage.

The through port 12 may be provided to allow, for example, two such routing organizers to be placed back-to-back and to allow fibres to pass from one to the other.

Figure 8:
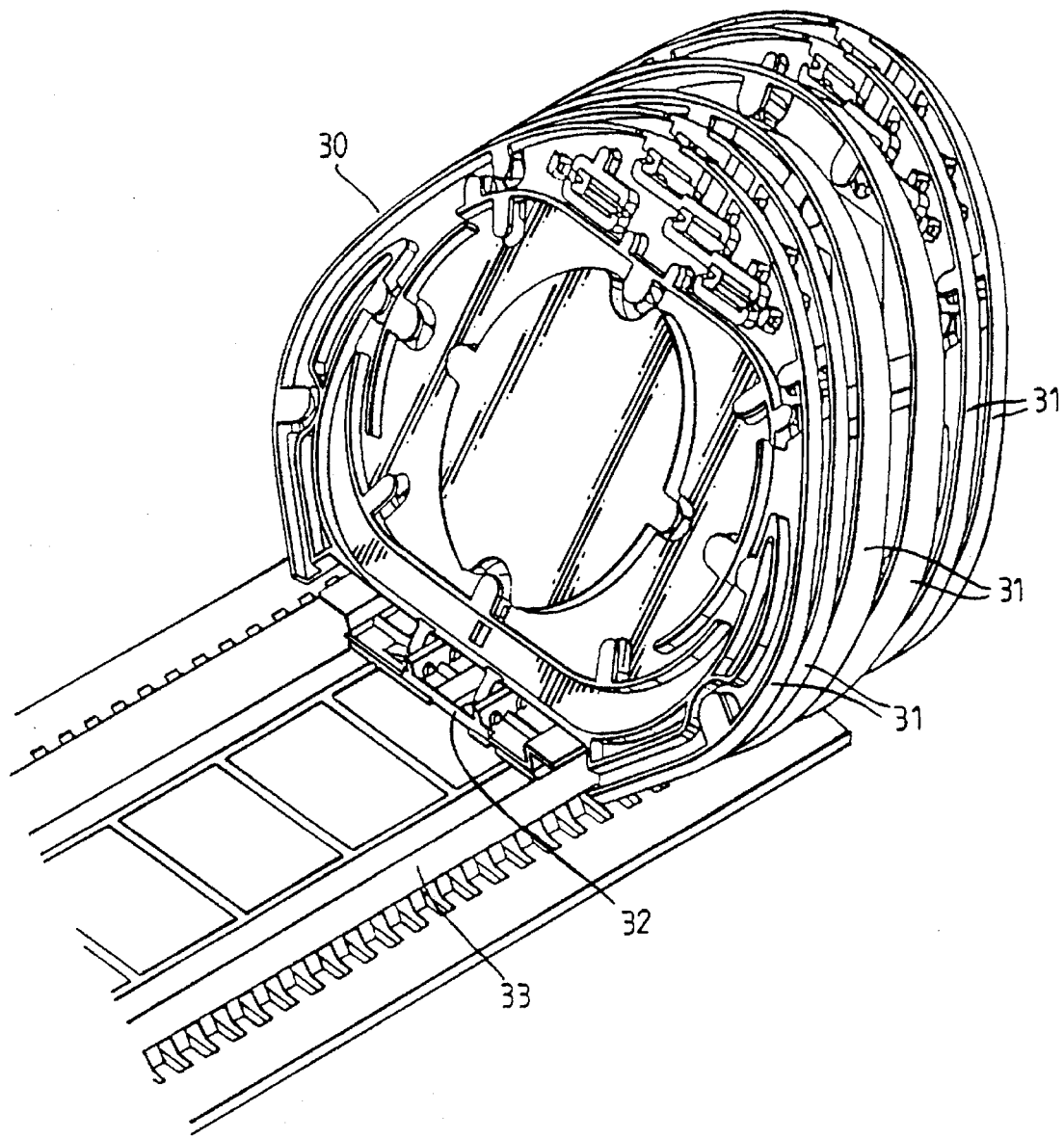
FIG. 8 shows fibre organizer trays for use with the organizer of the invention.

In addition to the routing organizer of FIG. 7, the splice tray organizer of FIG. 8 may be provided in the upper rectangular portion of the enclosure of FIG. 6. Fibres leaving the ports 10, 11 of the routing organizer are directed to the tray organizer of FIG. 8.

FIG. 8 illustrates a module 30 which may be pre-installed with fibres and which comprises a series of trays 31 hinged to a mounting device 32 which is in turn fixed to a base 33. The trays 31 can be seen to have means for storing loops of fibres and for securing fibre splices or fibre splitters. This module may be snap-fitted or otherwise attached in the rectangular space at the top of the enclosure of FIG. 6. Fibres leaving the organizer of the invention and passing via the routing organizer of FIG. 7 may then be spliced to these splice trays.

For the avoidance of doubt it is noted that the invention provides various components, assemblies, systems and methods for organizing, storing and protecting optical fibres and cables. Any of the various components disclosed can be used with any one or more other such component.

I claim:

1. An optical fibre organizer for receiving an optical fibre from one direction and storing loops thereof in a plane substantially perpendicular to said direction, which comprises: a substantially cylindrical block having a port running from an end of the cylinder where said port is substantially parallel to the axis of the cylinder to a side of the cylinder such that said optical fibre within said port is directed around the circumference of the cylinder.

2. An organizer according to claim 1, in which the port breaks the side of the cylinder substantially tangentially.

3. An organizer according to claim 1, in which a wall of the port that so directs optical fibre is curved at a minimum bend radius at least equal to the critical bend radius of the fibre.

4. An organizer according to claim 3, in which the curved wall results from a progressive broadening of the cross-sectional size of the port away from said end of the cylinder, the port also providing a substantially straight passage from said end of the cylinder to the opposite end of the cylinder.

5. An organizer according to claim 1, in which the port is open in the cross-section where said port breaks the side of the cylinder.

6. An organizer according to claim 5, the port having at or adjacent the place where said port breaks the side of the cylinder, means for directing the fibre towards a plane perpendicular to the axis of the cylinder.

7. An organizer according to claim 1, having a recess in its circumferential surface to accommodate a fibre splice or a fibre-tube joint.

8. An organizer according to claim 1, having means to retain said optical fibre adjacent its circumferential surface.

9. An organizer according to claim 1, in which the cross-sectional shape of the cylinder is substantially the envelope of two partially overlapping circles.

10. An organizer according to claim 9, in which the port runs from a position within one only of the overlapping circles and substantially abutting the other circle and advances longitudinally along the cylinder whilst rotating around that other circle.

11. An organizer according claim 1, which additionally comprises at least one organizer tray fed by fibres leaving the circumferential surface of the organizer, and mounted on a support substantially parallel to the axis of the cylinder.

* * * * *